United States Patent [19]

Davis

[11] Patent Number: 4,473,866
[45] Date of Patent: Sep. 25, 1984

[54] VEHICLE LIGHT SYSTEM

[76] Inventor: Murray A. Davis, 4874 Cote des Nieges Blvd., Apt. 1001, Montreal, Canada, H3V 1H4

[21] Appl. No.: 316,036

[22] Filed: Oct. 28, 1981

[51] Int. Cl.³ .............................................. F21V 21/30
[52] U.S. Cl. ....................... 362/35; 362/61; 362/80; 362/83; 362/293; 362/311; 362/356; 362/361; 362/368; 362/375; 362/335; 362/231
[58] Field of Search ............ 362/35, 61, 231, 80, 362/83, 293, 311, 356, 361, 368, 375, 335

[56] References Cited

U.S. PATENT DOCUMENTS

| | | |
|---|---|---|
| 1,196,081 | 8/1916 | Carence . |
| 1,623,219 | 4/1927 | Tolmach . |
| 1,910,779 | 5/1933 | Stockman . |
| 2,009,145 | 7/1935 | Nathan ................................ 362/319 |
| 2,223,678 | 12/1940 | Elliott . |
| 2,288,429 | 6/1942 | Baughn . |
| 2,749,568 | 6/1956 | Bird et al. . |
| 2,852,791 | 9/1958 | Febinger . |
| 2,866,175 | 12/1958 | Slater . |
| 3,058,142 | 10/1962 | Pollock . |
| 3,076,990 | 2/1963 | Dapprich . |
| 3,110,012 | 11/1963 | Manning . |
| 3,635,517 | 1/1972 | Wilfert et al. ........................ 362/83 |
| 3,676,845 | 7/1972 | Siksai . |
| 3,764,799 | 10/1973 | Schulz . |
| 3,784,974 | 1/1974 | Hamashige . |
| 3,790,104 | 2/1974 | Jones . |
| 3,934,301 | 1/1976 | Di Salvo et al. ..................... 362/253 |
| 4,080,685 | 3/1978 | Vanderpool .......................... 362/61 |
| 4,152,753 | 5/1979 | Amann ................................ 362/253 |
| 4,224,551 | 9/1980 | Liebegott ........................... 362/253 |

Primary Examiner—Stephen J. Lechert, Jr.
Attorney, Agent, or Firm—Cushman, Darby & Cushman

[57] ABSTRACT

A motor vehicle light system provides constant lighting or directional indication in a simple and effective manner, and keeps the lens clean so that it can be seen even under inclement weather conditions or the like. A hollow cylinder of transparent material, which may have alternating axially extending strips of different color, is mounted in a motor vehicle for rotation about a horizontal or vertical axis, with one or more light bulbs disposed in its hollow interior. A brush is stationarily mounted with respect to the motor vehicle, the brush bristles engaging the external periphery of the cylinder to keep it clean as the cylinder is rotated with respect to the brush, and the motor vehicle. A motor for rotating the cylinder may be series connected with the light bulb(s) within the cylinder.

13 Claims, 4 Drawing Figures

VEHICLE LIGHT SYSTEM

BACKGROUND AND SUMMARY OF THE INVENTION

Lighting assemblies in motor vehicles include one or more bulbs located behind a lens. Directional signals in motor vehicles are special types of lighting assemblies which conventionally comprise one or more bulbs located within a lens which are flashed in sequence to indicate direction changes. Such assemblies are effective in performing their intended function when visible, but, especially under inclement weather conditions, there can be many circumstances when the lens becomes covered with material which greatly reduces it transparency, making the light or signal much less visible than desirable. There have been proposals in the past for cleaning motor vehicle lamp lenses, however such proposals have occasioned the addition of extraneous structure movable on the outside of the vehicle, which has reduced the practical utility thereof.

According to the present invention, a lighting assembly for a motor vehicle or the like is provided which is kept clean during normal operation of the assembly, and utilizes the relative motion between components that is necessary to effect cleaning to also provide a form of directional indication. In this way the lens can remain visible under substantially all conditions. Where the lighting assembly is a directional signal, the provision of a movable component facilitates rather than hinders the primary signalling function of the assembly.

According to the present invention an assembly is provided that includes a hollow cylinder of transparent material, and means for mounting the cylinder within a motor vehicle or the like for rotation about an axis with respect to the vehicle or the like, with a portion of the cylinder visibly exterior of the motor vehicle or the like. When the assembly is used for directional indication, the cylinder includes alternate axially extending strips of different color (e.g. red and clear). Light emitting means, such as one or more light bulbs, are mounted within the cylinder hollow interior and connected up to a source of power, such as the vehicle battery. Power means, such as a small electric motor, are provided for effecting rotation of the cylinder about its axis, and cleaning means—such as a brush mounted to the motor vehicle—operatively engage the exterior peripheral surface of the cylinder for effecting cleaning thereof during rotation of the cylinder with respect to the cleaning means. The cylinder may be rotatable about either a horizontal or vertical axis, and the interiorly mounted bulbs may either be constantly on, or flashing, when desired, a directional indication is given by providing the alternating different colors of the cylinder strips.

The means for mounting the cylinder for rotation may comprise a first shaft extending from a diametrically extending member at a first end of the cylinder, with first bearing means surrounding the shaft, and second bearing means operatively engaging a second end of the cylinder, opposite the first end. The second bearing means may engage a peripheral portion of the cylinder, or a second shaft may be provided at the cylinder second end, the second shaft hollow allowing the passage of electrical lead wires to the bulb(s) therethrough. Where directional indication is to be provided, preferably the motor for rotating the cylinder and the light bulbs are connected in series, and the battery for the motor vehicle, so that each time the directional signal is activated the cylindrical "lens" gets a cleaning. However the operational mode of the assembly may be designed so that the cleaning mode is distinct from the light operational mode.

It is the primary object of the present invention to provide a simple and effective lighting assembly for motor vehicles or the like that will remain visible even under inclement weather conditions. This and other objects of the invention will become clear from an inspection of the detailed description of the invention, and from the appended claims.

DETAILED DESCRIPTION OF THE DRAWINGS

Figure 1:
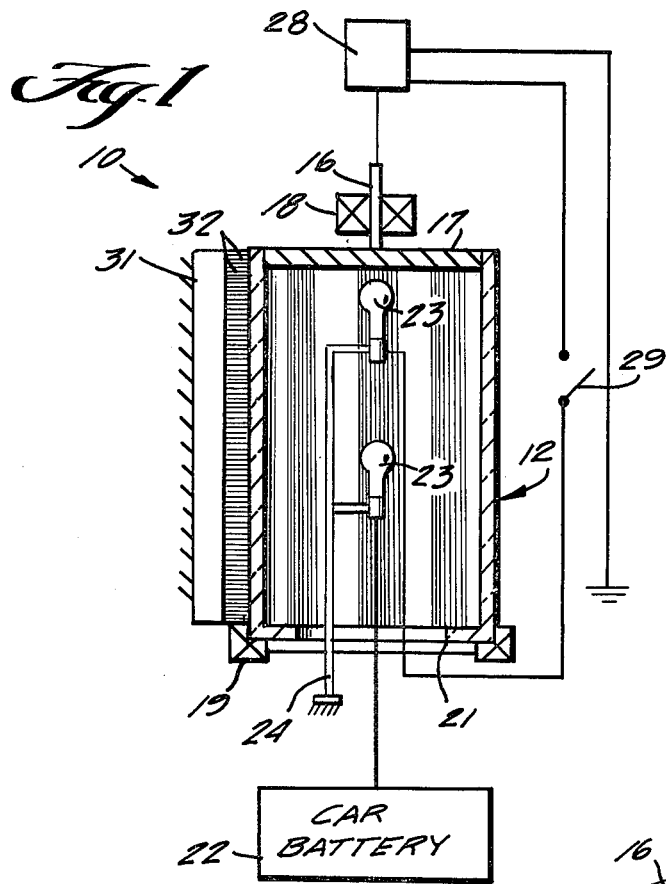
FIG. 1 is a side schematic view, partly in cross-section, illustrating an exemplary assembly according to the present invention.
Figure 3:
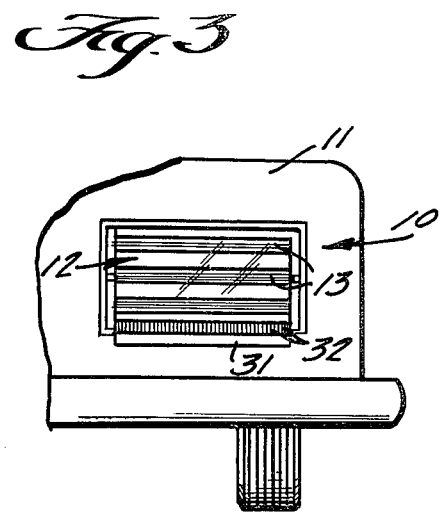
FIG. 3 is a front view of the apparatus of FIG. 3 when mounted for use in a motor vehicle.

A lighting assembly according to the present invention is shown generally by reference number 10 in FIGS. 1 and 3. The assembly 10 is shown in FIG. 3 in association with the motor vehicle 11 with which it is mounted.

Figure 2:
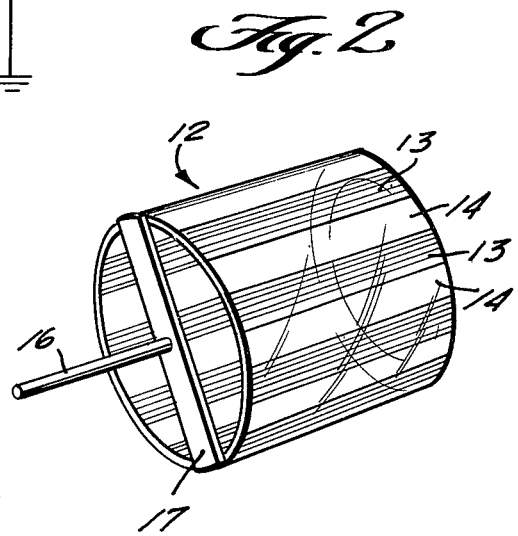
FIG. 2 is a perspective view of an exemplary hollow transparent cylinder utilizable in the assembly of FIG. 1.

A primary component of the assembly 10 comprises a hollow cylinder 12 (see FIGS. 2 and 3 in particular) of transparent material. The cylinder may be clear, or include alternately axially extending strips 13, 14 of different colors, depending upon use. For example the strips 13 can be red in color while the strips 14 are clear or white in color. The cylinder 12 preferably is made of a hard plastic, such as the type of plastic conventionally used in motor vehicle lenses.

Another important component of the assembly 10 comprises means for mounting the cylinder 12 for rotation about an axis and with respect to the motor vehicle 11 with which it is associated, a portion of the cylinder 12 being visible exterior of the motor vehicle 11 during operation. One form of such mounting means is illustrated most clearly in FIG. 1, and includes a shaft 16 extending along the axis of the cylinder 12 and attached to a diametrically extending member 17 at one end of the cylinder 12. The member 17 is illustrated as a bar in the drawings, but it may comprise a plate, spider, or like component. The shaft 16 is received by first stationary bearing means 18 surrounding it. Second bearing means operatively engage a second end of the cylinder, opposite the shaft 16. The second bearing means may take the form of the annular bearing 19 illustrated in FIG. 1, which directly engage the second end of the cylinder 12. Alternatively, another shaft and diametrically extending member may be provided at the second end, but preferably the second shaft would be hollow to allow the passage of electrical lines therethrough. It too would then be surrounded by a stationary bearing like the bearing 18.

If desired, the cylinder ends need not be entirely open. For instance, as illustrated at the bottom of FIG.

1, an annular interior member 21 may be provided closing off a portion of the second end of the cylinder 12.

The assembly 10 further comprises light emitting means mounted within the cylinder 12 hollow interior, and connected up to a power source, such as the car battery 22, for effecting energization thereof. Preferably the light emitting means comprises one or more conventional light bulbs 23, such as directional signal bulbs, electrically connected to the battery 22. The light bulbs 23 may be supported within the interior of the cylinder 12 by any suitable means, such as the cantilever arm construction 24 illustrated in FIG. 1. If desired, the bulbs 23 may be connected up to a conventional oscillator 26 for effecting flashing, or a flashing sequence, thereof. However such an oscillator is not utilized where the assembly 12 is a conventional light (headlight or tail light), and is not necessary in order for the assembly 10 to properly function as a directional indicator since the rotating differently colored strips 13, 14 will provide a directional indication.

The apparatus 10 further comprises power means, such as the small electrical motor 28, for effecting rotation of the cylinder 12 about its axis. The motor 28 is mounted adjacent the cylinder 12 and directly connected (or through gear reduction means) to the shaft 16. When energized, the motor 28 effects rotation of the cylinder 12 about its axis. Where directional indication is to be provided, preferably the motor 28 and the light bulb(s) 23 are series connected, with a manually actuated directional signal switch 29 also in circuit therewith. When the switch 29 is closed, energy is supplied from battery 22 to light bulb(s) 23 and motor 28, causing the light to go on and causing the cylinder 12 to rotate.

A final major component of the assembly 10 comprises cleaning means operatively mounted to the motor vehicle 11 or the like for engaging the exterior peripheral surface of the cylinder 12 for effecting cleaning thereof during rotation of the cylinder 12 with respect to the cleaning means. In the preferred form illustrated in the drawings, the cleaning means takes the form of a brush 31 stationarily mounted to the motor vehicle 11 and having bristles 32 extending therefrom into firm contact with the external periphery of the cylinder 12. The brush 31 may be mounted either within or outside the body of the motor vehicle 11, although an exterior mounting may be desirable to allow easy cleaning thereof when the vehicle is cleaned. Preferably the brush 31 is mounted vis-a-vis the direction of rotation of the cylinder 12 so that as a point on the periphery of the cylinder 12 moves from the exterior of the motor vehicle 11 toward the interior thereof, it must pass past the brush bristles 32. For the exemplary embodiment illustrated in FIG. 3, the cylinder 12 would rotate so that the colored strip 13 at the bottom of the cylinder 12 was just about to engage the brush bristles 32.

Figure 4:
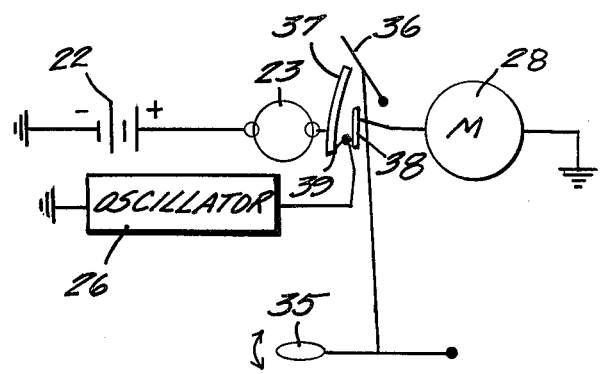
FIG. 4 is an electrical schematic illustrating an alternative electrical connection that may be provided between components.

While in the embodiment of the invention of FIG. 1 it is desirable to provide operation of the relative rotation between the "lens" 12 and the brush 31 each time the light bulb(s) 23 is actuated, any desired electrical connections can be utilized to provide any form of lighting. For instance, the bulb(s) 23 can be connected up to an oscillator at the same time that the motor 28 is operated, or—as illustrated schematically in FIG. 4—the bulb, the motor 28 and an oscillator 26 may be connected so that the light can be activated separately from, but at the same time as, the motor and oscillator illustrated schematically in FIG. 4—by providing a common actuator lever 35 for moving a movable bridging contact 36 into engagement with stationary contacts 37, 38, and/or 39.

OPERATION

Exemplary apparatus according to the invention having been described, one exemplary mode of may possible modes of operation thereof will now be set forth with respect to FIGS. 1 and 3 in particular.

Should the driver of a motor vehicle 11 desire to indicate a turn, or provide a like signal, the operator manually closes the switch 29, which completes a circuit from car battery 22 through light bulbs 23 and motor 28. Light bulbs 23 are constantly "on" when energized, and motor 28 effects rotatation of the cylinder 12 about its axis, the motor 28 rotating the shaft 39 which in turn rotates the cylinder 12 due to the interengagement between shaft 29 and diametrically extending member 40. As the cylinder 12 rotates, the exterior periphery thereof comes into contact with the brush bristles 32, effecting cleaning thereof, and the alternating differently-colored strips 13, 14 thereof visible from exteriorly of the motor vehicle 11 (see FIG. 3) provide a directional indication.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and assemblies.

What is claimed is:

1. In a motor vehicle or the like a light assembly comprising:

a hollow cylinder of transparent material, including alternately axially extending strips of different color;

means for mounting said cylinder within a motor vehicle or the like for rotation about an axis, and with respect to the vehicle or the like, with a portion of the cylinder visible exterior of the motor vehicle or the like;

light emitting means mounted within said cylinder hollow interior and connected up to a power source for effecting energization thereof;

power means for effecting rotation of said cylinder about its axis; and cleaning means operatively mounted to the motor vehicle or the like for operatively engaging the exterior peripheral surface of said cylinder of said cylinder for effecting cleaning of the peripheral surface during rotation of said cylinder with respect to said cleaning means.

2. An assembly as recited in claim 1 wherein said cleaning means comprises a brush stationarily mounted to the motor vehicle or the like and having bristles extending into engagement with the exterior peripheral surface of said cylinder.

3. An asembly as recited in claim 1 wherein said light emitting means comprises at least one flashing light bulb.

4. An assembly as recited in claim 1 wherein said cylinder axis of rotation is horizontal.

5. An assembly as recited in claim 1 wherein said cylinder axis of rotation is vertical.

6. In a motor vehicle or the like a light assembly comprising:

a hollow cylinder of transparent material;

means for mounting said cylinder within a motor vehicle or the like for rotation about an axis, and with respect to the vehicle or the like, with a portion of the cylinder visible exterior of the motor vehicle or the like; said means for mounting said cylinder for rotation comprising: a shaft extending from a diametrically extending member at a first end of said cylinder; first bearing means surrounding said shaft; and second bearing means operatively engaging a second end of said cylinder, opposite said first end;

light emitting means mounted within said cylinder hollow interior and connected up to a power source for effecting energization thereof;

power means for effecting rotation of said cylinder about its axis; and cleaning means operatively mounted to the motor vehicle or the like for operatively engaging the exterior peripheral surface of said cylinder for effecting cleaning of the peripheral surface during rotation of said cylinder with respect to said cleaning means.

7. An assembly as recited in claim 6 wherein electrical wires extend into the hollow interior of said cylinder at said second end thereof, and are connected to an electrically powered light-emitting member mounted within the hollow cylinder.

8. An assembly as recited in claim 7 wherein said power means comprises an electrical motor mounted adjacent said cylinder and connected to said shaft.

9. An assembly as recited in claim 8 wherein said motor and said electrically powered light-emitting member are connected in series, and to a battery for the motor vehicle or the like.

10. An assembly as recited in claim 6, or 9 wherein said cylinder includes alternately axially extending strips of different color.

11. In a motor vehicle or the like a light assembly comprising:

a hollow cylinder of transparent material including alternately axially extending strips of different color;

means for mounting said cylinder within a motor vehicle or the like for rotation about an axis, and with respect to the vehicle or the like, with a portion of the cylinder visible exterior of the motor vehicle or the like;

light emitting means mounted within said cylinder hollow interior and connected up to a power source for effecting energization thereof;

means for operatively connecting said cylinder to a power means for effecting rotation of said cylinder about its axis; and a brush stationarily mounted to the motor vehicle or the like and having bristles extending into engagement with the exterior peripheral surface of said cylinder.

12. An assembly as recited in claim 11 wherein said light emitting means comprises at least one flashing light bulb.

13. An assembly as recited in claim 11 wherein said means for mounting said cylinder for rotation comprises: a shaft extending from a diametrically extending member at a first end of said cylinder; first bearing means surrounding said shaft; and second bearing means operatively engaging a second end of said cylinder, opposite said first end.

* * * * *